United States Patent [19]

DiGerlando

[11] Patent Number: 5,078,644
[45] Date of Patent: Jan. 7, 1992

[54] APPARATUS FOR CUTTING THE SECOND JOINT OF A POULTRY WING

[75] Inventor: Benedict DiGerlando, Cedar Bluff, Ala.

[73] Assignee: James Edwin Mauer, Cedartown, Ga.

[21] Appl. No.: 557,677

[22] Filed: Jul. 24, 1990

[51] Int. Cl.⁵ .............................................. A22C 21/00
[52] U.S. Cl. ...................................... 452/169; 452/166
[58] Field of Search ................ 452/169, 166, 155, 160

[56] References Cited

U.S. PATENT DOCUMENTS

| 4,207,653 | 6/1980 | Gasbarro | 452/169 |
| 4,480,353 | 11/1984 | Martin et al. | 452/166 |
| 4,577,368 | 3/1986 | Hazenbroek | 452/169 |
| 4,651,383 | 3/1987 | van der Eerden | 452/169 |
| 4,769,872 | 9/1988 | Hazenbroek et al. | 452/169 |

Primary Examiner—Willis Little
Attorney, Agent, or Firm—Hopkins & Thomas

[57] ABSTRACT

A pair of opposed discs having inner surfaces provided with recesses which receive second joints of poultry. A knife is disposed in a stationary position between the discs for cutting each second joint from an intermediate portion outwardly so as to leave one cartilage which joins the bones of the second joint together in an uncut condition so as to provide a product which is V-shaped. In the second embodiment of the invention, two knives are disposed in tandem so that one knife cuts the second joint from an intermediate position outwardly and then the second knife cuts the uncut cartilage.

15 Claims, 2 Drawing Sheets

APPARATUS FOR CUTTING THE SECOND JOINT OF A POULTRY WING

BACKGROUND OF THE INVENTION

A. Field of the Invention

This invention relates to a method and apparatus of cutting the second joints of poultry wings and is more particularly concerned with a method and apparatus of slicing the second joint longitudinally so as to cut one or both of the cartilages which connect the ends of the radius and ulna bones of the second joint.

B. Description of Related Art

In the past, the second joint of the wing of a fowl has been sliced longitudinally so as to separate this second joint into two separate parts. Recently, a machine has been developed for semiautomatically severing the second joint so as to separate it into two pieces, this device including a pair of rotatable discs having opposed inwardly opening recesses, each pair of which respectively receive the second joints of the wings. These two discs are separated by a central spacer plate to provide a circumferential space between the discs, for receiving a stationary knife which is engaged by each wing, as the discs move the second joints in a rotary or orbital path. There is also a cam for automatically ejecting the cut pieces of second joint after such pieces have been severed.

The structure described above, while being capable of severing both of the cartilages which join the ulna and radius bones of the wing together, must sever both cartilages essentially simultaneously. The present invention provides a machine for severing only one cartilage and a machine which does a better job of cutting either or both cartilages of the second joint.

SUMMARY OF THE INVENTION

Briefly described, the present invention includes a machine which has a motor rotating a sidewise extending shaft which carries a pair of opposed discs spaced apart by a central spacer. These opposed discs are identical to each other and include a plurality of inwardly opening radially extending slots or recesses, the ends of which are open at the periphery of the disc. These slots are arranged in axially, opposed, parallel relationship to each other. The smaller spacer discs between the hubs of the opposed discs establish an appropriate spacing which enables a stationary blade or knife to be disposed radially between the two rotating discs, this stationary blade having at its distal end a point formed by a pair of converging cutting edges. The inner arcuate surface of the blade or knife is concentric with but spaced from the spacer disc. The arcuate surface terminates outwardly of the inner ends of the slots or recesses.

When the second joints of wings of poultry are inserted into successive opposed pairs of slots, the second joints are carried by the two discs in an orbital path so that the stationary blade protrudes through the second joint, between the radius and ulna bones and progressively slices the second joint outwardly. The blade also progressively slices only a portion of the second joint in an inward direction so as to leave the inner cartilage intact and uncut such that the second joint may be discharged as a V-shaped or U-shaped product. The device of the present invention also includes a guide which assures that the second joint is fully inserted into the opposed pair of slots before it is cut and an ejector which progressively ejects the second joint from the pair of slots.

In a second embodiment, the knife is formed as a U-shaped element so that one leg of the U-shaped element forms a first cutting edge which splits the second joint longitudinally and then severs one cartilage while the other leg of the U-shaped element forms a second cutting edge which cuts the inner uncut cartilage. Thereafter, both parts of the second joint are discharged, simultaneously.

Accordingly, it is an object of the present invention to provide an apparatus for cutting second joints of poultry wings which apparatus is inexpensive to manufacture, durable in structure, and efficient in operation.

Another object of the present invention is to provide an apparatus for cutting the second joints of poultry wings, which apparatus can be readily and easily disassembled for cleaning.

Another object of the present invention is to provide an apparatus for cutting the second joints of poultry wings, wherein the apparatus is readily and easily operated by an unskilled laborer.

Another object of the present invention is to provide an apparatus which will readily and easily sever the one cartilage of each wing so as to provide U-shaped or V-shaped poultry products.

Another object of the present invention is to provide a device which will more readily and easily sever longitudinally the second joint of a fowl and will do so without providing chips of bone left in the resulting product.

Other objects, features, and advantages of the present invention will become apparent from the following description when taken in conjunction with the accompanying drawing wherein like characters of reference designate corresponding parts throughout the several views.

DETAILED DESCRIPTION

Figure 1:
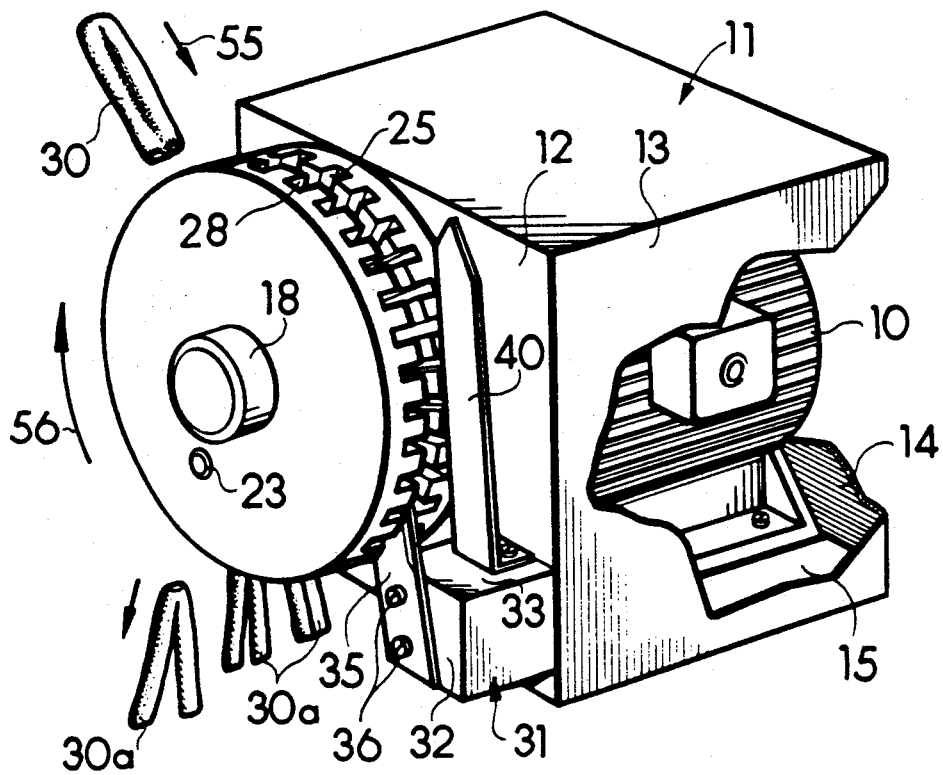
FIG. 1 is a fragmentary perspective view of an apparatus for cutting the second joints of poultry wings and showing the second joint being inserted into the device and being discharged therefrom.

Referring now in detail to the embodiment chosen for the purpose of illustrating the present invention, numeral 10 denotes generally an electric motor which is housed in a box-like housing or casing 11. The box-like housing or casing includes a vertically disposed front panel 12, side panels, such as side panel 13, and a back panel 14. The box 11 is closed by a top 16.

The motor 10 is provided with a shaft 14 which protrudes sidewise through the central portion of the front panel 12 and outwardly therefrom. The end portion of shaft 17 is provided with external threads which receive thereover a retaining cap 18. Mounted on shaft 17 are a pair of opposed substantially identical second joint receiving and transporting discs 20 and 21. The discs 20 and 21 are firmly secured to shaft 17 so that they rotate therewith. Disposed between the discs 20 and 21 is a spacer plate in the form of a central disc 22. A common alignment pin 23 passes through the hub portions of the disc 20 and 21 and through the spacer plate 22. The function of this alignment pin 23 is to assure that the three discs 20, 21, and 22 rotate with each other, at all times.

Disc 20 is provided with a plurality of equally circumferentially spaced grooves, slots or recesses 25. Each groove, slot or recess 25, is open along its innermost portion and is also open at the periphery of the disc 20. Each slot, recess or groove 25, terminates in a rounded inner end which is spaced outwardly from the hub of disc 20. Thus, the hub or inner portion of the disc 20 is essentially solid except for the alignment pin 23 which passes therethrough. The disc 21 is identical to disc 20 and is provided with a plurality of radially extending, circumferentially, equally spaced, recesses, slots or grooves 28. The grooves 25 and the grooves 28 are in radially aligned, opposed pairs around the inner surfaces and peripheries of the two discs 20 and 21.

The diameter of the spacer disc 22 is less than the diameter of the hub portions of the two discs 20 and 21 and, therefore, the periphery of spacer disc 22 is inwardly of the inner end portions of the recesses or grooves 25 and 28. The axially opposed pairs of grooves 25 and 28 are thus spaced apart sufficiently that they are capable of receiving, therebetween, a second joint 30 of the wing of a chicken or other poultry, each pair of grooves 25 and 28 receiving only the side portions of the second joint, thereby holding the second joint transversely, therein. When inserted into a pair of slots or recesses 25 and 28, the second joint 30 is manually oriented so that the ulna and radius bones thereof are aligned in an axial direction with respect to the axis of rotation of the discs 20 and 21. Hence, only the central part of each second joint 30 is exposed in the space between the inner surfaces of the discs 20 and 21.

Figure 2:
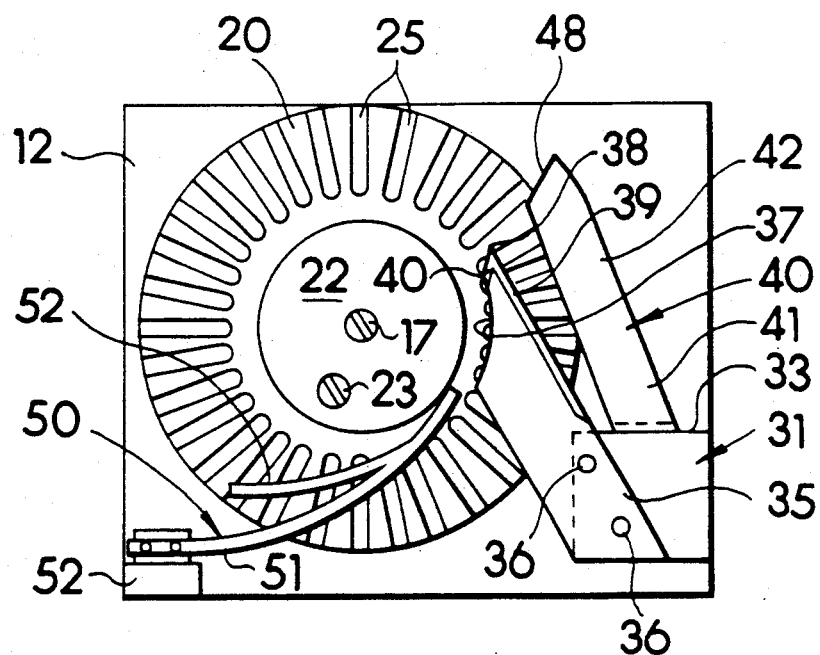
FIG. 2 is a transverse, vertical sectional view of the machine shown in FIG. 1.

Mounted at the lower corner of the front panel 12 is a forwardly extending support block 31 having an outer surface 32 and a top surface 33. Mounted by its proximal end to the front surface 32 is an upwardly and inwardly extending, flat knife or blade 35. This proximal end of knife or blade 35 is secured in place in cantilever fashion on the radially disposed front surface 32 by means of removable bolts 36. Surface 32 orients the blade 35 so that as to be in a radial plane essentially midway between the two transportation discs 20 and 21. The blade 35 extends inwardly and upwardly so as to terminate in an inner, arcuate surface 37 which is concentric with but spaced from the spacer disc 22, as best seen in FIG. 2.

It will be observed that the inner concaved or arcuate surface 37 of knife 35 is not for cutting and is concentric about the horizontal axis of shaft 17, being spaced outwardly of the inner end portions of the recesses 25 and 28 so that the uncut cartilages of the second joints 30 will be passed by the transportation discs 20 and 21 inwardly of this inner surface 37.

The upper end portion of the distal end of the blade 35 terminates in a point 38 which faces the direction of travel of the second joints 30 and is radially outwardly of the inner surface 37. Cutting edges 39 and 40 taper toward point 38 forms the apex, therefor. These converging cutting edges 39 and 40 are appropriately beveled for progressively severing each second joint 30 a it is moved in its clockwise orbital path by the disc 20 and 21. The outer cutting edge 39 is the major cutting edge of blade 35 while the inner cutting edge 40 is much shorter and is for the purpose of cutting only a portion of the fleshy part of the second joint 30 which is outwardly of the inner cartilage of the second joint 30. The function of the outer edge 39 is to progressively cut the fleshy part of the second joint 30 outwardly between the ulna and radius bones, after the point 38 has penetrated initially into an intermediate portion of the second joint 30. The beveled or sharpened edge 39 about the plane of shaft 17 and initially extends at about a right angle to the recesses 25, which angle gets progressively greater as the second joint 30 travels from an uppermost position in the first quadrant where the tip is intermediate the ends of the recess or groove 25 to a lower portion in the second quadrant where the edge is totally outside the outer periphery of the disc 20 and 21. The blade 35 is sufficiently thin that it does not engage the inner surface of either disc 20 or 21 but is sufficiently thick that it urges the bones apart as the outer cartilage of second joint 30 is severed by the edge 39.

Protruding forwardly and inwardly from the top 33 of block 31 is a guide member 40. This guide member 40 has a flat base 41 at its proximal end and a flat upwardly and inwardly extending body 42. This body 42 extends in cantilever fashion parallel to and in a common plane with and outwardly of the knife or blade 35. The distal end 48 of guide member 40 is arranged at an acute angle to the radius of the central shaft 17, extends on both sides of the periphery of the discs 20 and 21 and is ahead of point 38, whereby this stationary distal end 48 will urge each of the second joints 30 radially inwardly in their associated, opposed pair of recesses 25 and 28 so that each second joint 30 is seated appropriately against the inner end portions of the two recesses 25 and 28 with its inner cartilage radially inwardly of surface 37.

The ejector 50 is circumferentially rearward of knife 35 and includes a curved metal ejector rod 51, the lower end of which is mounted by a mounting block 52 on the front surface 12. This ejector rod 51 curves across the path of travel of second joints 30 from the lower outer corner of the machine upwardly and inwardly to terminate immediately below the lower end of the inner surface 37 so that after each second joint 30 has been cut, the convex surface of ejector bar 51 will act as a cam on the inner end portion of the sliced second joints 30a to eject them progressively downwardly at the bottom of the discs 20 and 21 from their respective pairs of recesses 25 and 28, as illustrated in FIG. 1. The curved rod has a convex lower surface and a concave upper surface as illustrated in FIG. 2. The rod has a rearwardly and upwardly curved guide bar 52, the function of which is simply to act as a secondary ejector for any material in the recesses 25 and 28 and maintain the upper end portion of the guide bar 51 in place appropriately closely adjacent to the inner periphery of the spacer discs 20 and 21 and below the arcuate inner surface 37.

In operation, an operator orients and manually inserts successive second joints 30 into opposed pairs of slots 25 and 28, at the fourth quadrant, pushing each second joint 30 inwardly as the two discs 20 and 21 are rotated in the direction of the arrow 56. The speed of rotation is sufficiently slow that the operator can usually insert successive second joints into successive pairs of opposed recesses 25 and 28. The operator usually stands on the side of the machine opposite the blade 35 and the guide 40 and usually inserts the second joint 30 at about a 45° angle inwardly and downwardly as shown by arrow 55. The inserted second joint 30 then is carried around to where its protruding outer end may be engaged by the camming surface 42 which urges the second joint 30 downwardly so that it is fully within its two opposed slots 25 and 28. The camming edge or surface 42 is therefore above the tip or point 42 of the knife 35. Hence, only after the second joint 30 has been urged inwardly to its fully seated position, will the knife tip 42 penetrate an intermediate portion between the ulna bone and radius bones of the second joint 30. As the second joint 30 is carried progressively in its orbital path around shaft 17, the blade 35 protrudes and begins cutting into the second joint between the radius and ulna bones and the two cartilages joining together the ends of each bone. The edge 40 being relatively short only cuts a short distance inwardly so that the inner cartilage of the second joint is unsevered and remains in its original state. The major or outer edge 39 which is at an acute angle to the edge 40 progressively slices the second joint 30 outwardly as the second joint 30 continues to move in its orbital path until the knife edge 39 severs totally the cartilage at the outer end portion of the second joint 30. The blade 35 is sufficiently thick that it will tend to have a wedging action on the outer cartilage, as the cartilage is being severed. The inner cartilage, however remains in the extreme inner portions of the recesses 25 and 28 so that this cartilage travels below surface 37, through the space between the spacer disc 22 and the inner surface 37 of knife 35. Thence, as discs 20 and 21 are rotated, each inner end of each second joint 30 engages the outer convex camming surface of the ejector rod 51 and thereby the second joint 30 is urged outwardly so as to be automatically discharged downwardly from the machine during the bottom portion of the travel of the discs 20 and 21.

Figure 4:
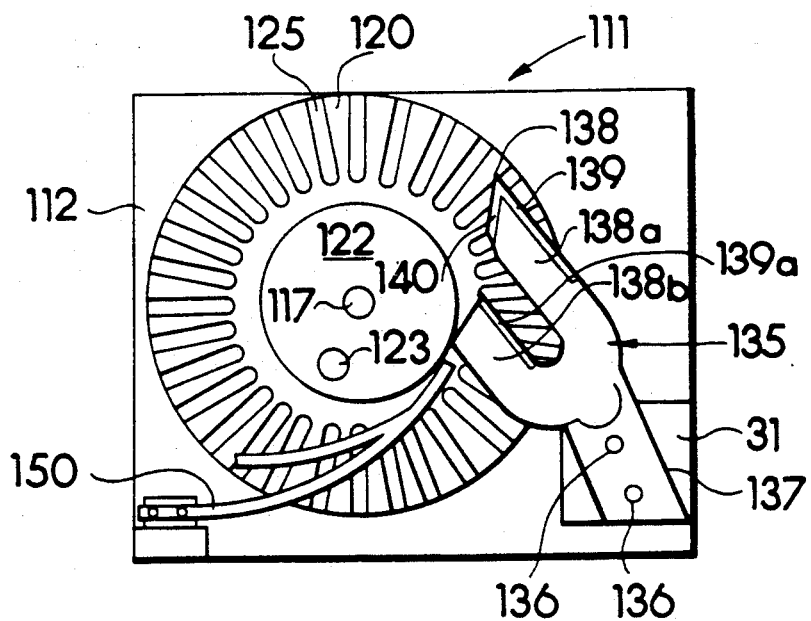
FIG. 4 is a view similar to FIG. 2 except showing a modified form of the present invention.
Figure 3:
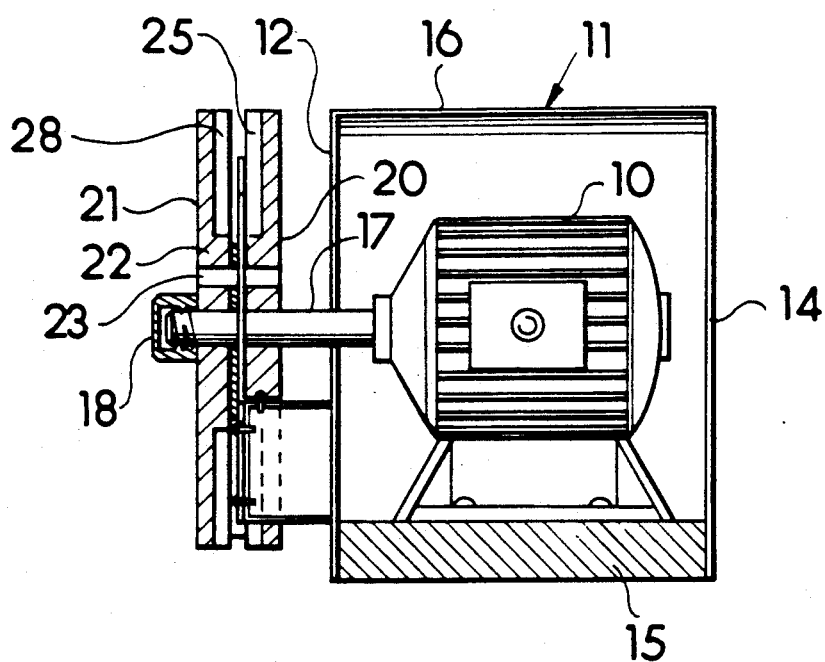
FIG. 3 is a longitudinal, vertical sectional view of the machine shown in FIG. 1.

In FIG. 4 is shown a modified form of the invention which will sever both cartilages. The structure of the device is identical to the device of FIGS. 1 through 3 except for the knife assembly. The device of FIG. 4 includes a housing 111, a shaft 117, which is rotated by a motor (not shown), the shaft 117 protruding through a front wall 112. The disc assembly of FIG. 4 is identical to the disc assembly of FIGS. 1 through 3 except that only the inner disc 120 is shown having its recesses 125 radially disposed around the peripheral portion of the disc 120. A pin 123 locks the inner disc 120 and an outer disc (not shown) together. The machine also has a spacer plate or disc 122 which spaces the two discs, such as disc 120, apart. The ejector assembly 150 is identical to ejector 50.

In the second embodiment, the knife 135 is a flat member mounted on the front of mounting block 131 by bolts 136. This knife assembly includes a shank or base 137 through which the bolts 136 pass and a bifurcated upwardly and inwardly extending blade portion which protrudes inwardly between the two discs, such as disc 120. This bifurcated portion includes an upper knife 138a and a lower knife 138b, the two knives 138a and 138b extending essentially parallel to each other but circumferentially spaced from each other. The upper knife has a point 138 formed by the upper outer edge 139 and the upper inner edge 140, the two edges 139 and 140 forming an acute angle and tapering to the point 138. The function of the blade 140 is essentially the same as blade 35, namely to cut a major portion of the central part of each second joint 30 which is inserted into the recesses formed by a recess 125 and its opposed recess, such as recess 28. The blade or cutting edge 139 is inclined slightly so that the blade 139 gradually cuts outwardly through only the outer part of the flesh between the two bones and also entirely through the cartilage on the outer peripheral portion of the second joint 30. The inner cutting edge 140 extends at an angle inwardly and downwardly from point 138 so as to cut a substantial part of the flesh between the two bones, without cutting the inner cartilage. The inner cartilage, thus passes uncut in a generally downward direction as viewed in FIG. 4 and is then engaged and cut by the cutting edge 138a on the lower blade 138b. This upper edge 138a begins at a point which is radially outwardly of shaft 117 by about the same amount as the inner end portions of the recesses, such as recess 125. Hence, the cut by blade 138b of the second cartilage is from the inside toward the outside, as the blade 138a holds a portion of the previously cut second joint, apart. The ejector 150 then functions to progressively eject each fully cut second joint outwardly.

It will be obvious to those skilled in the art that many variations may be made in the embodiment here chosen for the purpose of illustrating the present invention without departing from the scope thereof as defined by the appended claims.

I claim:

1. An apparatus for severing the second joints of poultry wings, the apparatus having a motor with a shaft rotatable about an axis; a pair of opposed complimentary discs disposed in spaced relationship to each other and mounted concentrically on said shaft for rotation thereby; there being provided a space between the opposed inner surfaces of said discs; each of said discs having a central hub and a plurality of circumferentially spaced, radially extending recesses around the inner surface of each disc; each recess being defined by an inner end adjacent to said hub and extending from said inner end outwardly to the periphery of the disc, each recess being open along the inner surface and at the periphery of its disc; the recesses of one disc being arranged respectively opposite to the recesses of the other disc to form opposed pairs of recesses adapted to receive and hold, between each pair of recesses, a second joint inserted from the peripheries of said disc radially inwardly therein so that the ulna and radius bones of the second joint are aligned with each other axially of said discs, and a knife disposed in the space between said inner surfaces of said discs, the improvement comprising:

said knife having a cutting edge spaced radially outwardly of inner ends of said recesses and inwardly of the peripheries of said discs, whereby the cutting edge successively cuts through each second joint between the ulna and radius bones and thence outwardly through one cartilage of the outer end portion of said second joint the inner edge of said knife terminating radially outward of said inner ends of said recesses so that the inner cartilage joining the bones at the inner end of each second joint is left uncut by the knife as each second joint passes the knife.

2. The apparatus defined in claim 1, wherein said knife has a point at the inner end of said cutting edge for penetrating each second joint between the ulna and radius bones and in an intermediate portion with respect to the ends of said second joint.

3. The apparatus defined in claim 1, wherein said knife is supported externally of said disc and wherein said cutting edge of said knife is disposed angularly so that each second joint is progressively cut outwardly as the second joint is rotated in an orbital path by said disc.

4. The apparatus defined in claim 1, wherein said knife is mounted by its proximal end externally of said disc and wherein said knife protrudes inwardly to terminate at a distal end, said knife having a point adjacent to its proximal end which penetrates the successive second joints, said cutting edge extending from said point outwardly along an edge of said knife.

5. An apparatus for severing the second joints of poultry wings, the apparatus having a motor with a shaft rotatable about an axis; a pair of opposed complimentary discs disposed in spaced relationship to each other and mounted concentrically on said shaft for rotation thereby; there being provided a space between the opposed inner surfaces of said discs; each of said discs having a central hub and a plurality of circumferentially spaced, radially extending recesses around the inner surface of each disc; each recess being defined by an inner end adjacent to said hub and extending from said inner end outwardly to the periphery of the disc, each recess being open along the inner surface and at the periphery of its disc; the recesses of one disc being arranged respectively opposite to the recesses of the other disc to form opposed pairs of recesses adapted to receive and hold, between each pair of recesses, a second joint inserted from the peripheries of said disc inwardly therein so that the ulna and radius bones of the second joint are aligned with each other axially of said discs, and a knife disposed in the space between said inner surfaces of said discs, the improvement comprising:
  said knife having a cutting edge spaced radially outwardly of inner ends of said recesses and inwardly of the peripheries of said discs, whereby the cutting edge successively cuts through each second joint between the ulna and radius bones and the cartilage of the outer end portions of said second joint; the inner edge of said knife terminating radially outward of said inner ends of said recesses so that the inner cartilage joining the bones at the inner end of each second join is left uncut by the knife as each second joint passes the knife; and
  including a spacer disc disposed in the space between said complementary discs, said knife having an arcuate, concaved inner surface spaced from said spacer disc and concentric about said shaft.

6. The apparatus defined in claim 1, wherein said cutting edge includes a point and a pair of cutting edges which diverge circumferentially rearwardly of said point.

7. The apparatus defined in claim 6, wherein said pair of cutting edges includes a minor edge inwardly of said point and a major edge outwardly of said point.

8. The apparatus defined in claim 1, including ejector means inwardly of the inner surface of said knife for engaging the uncut portion of each of said second joints for urging the same progressively outwardly of the recesses, whereby said second joints are progressively discharged in a cut condition in which only one of the cartilages thereof is uncut.

9. The apparatus defined in claim 1, including a second knife disposed in said space and circumferentially rearwardly of the first mentioned knife for cutting the uncut cartilage of each second joint.

10. An apparatus for severing the second joints of poultry wings, the apparatus having a motor with a shaft rotatable about an axis; a pair of opposed complimentary discs disposed in spaced relationship to each other and mounted concentrically on said shaft for rotation thereby; there being provided a space between the opposed inner surfaces of said discs; each of said discs having a central hub and a plurality of circumferentially spaced, radially extending recesses around the inner surface of each disc; each recess being defined by an inner end adjacent to said hub and extending from said inner end outwardly to the periphery of the disc, each recess being open along the inner surface and at the periphery of its disc; the recesses of one disc being arranged respectively opposite to the recesses of the other disc to form opposed pairs of recesses adapted to receive and hold, between each pair of recesses, a second joint inserted from the peripheries of said disc inwardly therein so that the ulna and radius bones of the second joint are aligned with each other axially of said discs, and a knife dispose din the space between said inner surfaces of said discs, the improvement comprising:
  said knife having a cutting edge spaced radially outwardly of inner ends of said recesses and inwardly of the peripheries of said discs, whereby the cutting edge successively cuts through each second joint between the ulna and radius bones and the cartilage of the outer end portions of said second joint; the inner edge of said knife terminating radially outward of said inner ends of said recesses so that the inner cartilage joining the bones at the inner end of each second join is left uncut by the knife as each second joint passes the knife;
  including a second knife disposed in said space and circumferentially rearwardly of the first mentioned knife for cutting the uncut cartilage of each second joint; and
  the first mentioned knife and said second knife are joined at their proximal end portions for forming a unitary, integral member and means externally of said disc for securing the proximal end of said member in a fixed position with respect to said disc.

11. The apparatus defined in claim 10, wherein the first mentioned knife cuts said second joint from an intermediate position radially outwardly and said second knife cuts the inner cartilage of said second joint from a position inwardly of said inner cartilage, outwardly.

12. The apparatus defined in claim 11 wherein the first mentioned knife holds the severed parts apart as the second knife cuts the inner cartilage.

13. A process for severing the second joints of poultry wings between the ulna and radius bones of each second joint comprising the steps of passing said second joints successively along a prescribed path in oriented positions, disposing a pointed knife in a fixed position in said prescribed path with the point of said first knife pointing in a direction opposite to the direction of travel of said second joints such that the point progressively passes through the intermediate portions and between the ulna and radius bones of the successive second joints without severing the bones thereof; continuing to move said second joints so that said knife successively cuts the flesh of said second joints outwardly and then severs the outer cartilage of each second joint, while arresting the outward movement of said second joint so that the inner cartilage of each second joint remains uncut.

14. The process defined in claim 13 in which the outward movement of each second joint is arrested by the inner cartilage abutting a portion of said knife.

15. The process defined in claim 14 wherein each inner cartilage of each second joint is progressively cut from a position external of said inner cartilage outwardly.

* * * * *